(12) United States Patent
Hosokawa et al.

(10) Patent No.: US 10,891,543 B2
(45) Date of Patent: Jan. 12, 2021

(54) LUT BASED SYNAPSE WEIGHT UPDATE SCHEME IN STDP NEUROMORPHIC SYSTEMS

(71) Applicant: SAMSUNG ELECTRONICS CO., LTD., Suwon-si (KR)

(72) Inventors: Kohji Hosokawa, Shiga-ken (JP); Masatoshi Ishii, Shiga-ken (JP); Yutaka Nakamura, Kyoto (JP); Junka Okazawa, Kyoto (JP); Takeo Yasuda, Nara (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 14/980,554

(22) Filed: Dec. 28, 2015

(65) Prior Publication Data

US 2017/0185889 A1    Jun. 29, 2017

(51) Int. Cl.
*G06N 3/063* (2006.01)
*G06N 3/04* (2006.01)

(52) U.S. Cl.
CPC .......... *G06N 3/063* (2013.01); *G06N 3/049* (2013.01)

(58) Field of Classification Search
CPC ............ G06N 3/08; G06N 3/04; G06N 3/063; G06N 3/082; G06N 99/005; G06N 20/00
USPC ........................................................ 706/25
See application file for complete search history.

(56) References Cited

U.S. PATENT DOCUMENTS

| | | | |
|---|---|---|---|
| 5,278,945 A | 1/1994 | Basehore et al. | |
| 5,333,239 A * | 7/1994 | Watanabe | G06N 3/084 706/25 |
| 8,943,008 B2 | 1/2015 | Ponulak et al. | |
| 9,087,301 B2 | 7/2015 | Alvarez-Icaza Rivera et al. | |
| 9,111,224 B2 | 8/2015 | Hunzinger | |
| 9,349,092 B2 | 5/2016 | Thibeault et al. | |

(Continued)

FOREIGN PATENT DOCUMENTS

WO    2014189970    11/2014

OTHER PUBLICATIONS

Pfeil et al.—2012—"Is a 4-bit synaptic weight resolution enough?— constraints on enabling spike-timing dependent plasticity in neuromorphic hardware"—https://www.frontiersin.org/articles/10.3389/fnins.2012.00090/full (Year: 2012).*

(Continued)

*Primary Examiner* — Viker A Lamardo
(74) *Attorney, Agent, or Firm* — NSIP Law

(57) ABSTRACT

A method and system are provided for updating synapse weight values in neuromorphic system with Spike Time Dependent Plasticity model. The method includes selectively performing, by a hardware-based synapse weight incrementer or decrementer, one of a synapse weight increment function or decrement function, each using a respective lookup table, to generate updated synapse weight values responsive to spike timing data. The method further includes storing the updated synapse weight values in a memory. The method additionally includes performing, by a hardware-based processor, a learning process to integrate the updated synapse weight values stored in the memory into the Spike Time Dependent Plasticity model neuromorphic system for improved neuromorphic simulation.

20 Claims, 14 Drawing Sheets

(56) References Cited

U.S. PATENT DOCUMENTS

| | | | |
|---|---|---|---|
| 9,984,326 | B1 | 5/2018 | Chen et al. |
| 10,055,434 | B2* | 8/2018 | Birdwell ............ G06N 3/0635 |
| 2012/0084241 | A1* | 4/2012 | Friedman ............ G06N 3/0635 |
| | | | 706/27 |
| 2014/0012788 | A1* | 1/2014 | Piekniewski ............ G06N 3/02 |
| | | | 706/16 |
| 2014/0032465 | A1* | 1/2014 | Modha .................. G06N 3/063 |
| | | | 706/27 |
| 2014/0180984 | A1 | 6/2014 | Arthur et al. |
| 2014/0180985 | A1 | 6/2014 | Alvarez-Icaza Rivera et al. |
| 2014/0310216 | A1 | 10/2014 | Sarah et al. |
| 2014/0351186 | A1 | 11/2014 | Julian et al. |
| 2015/0046381 | A1 | 2/2015 | Malone et al. |
| 2015/0046382 | A1* | 2/2015 | Rangan ................. G06N 3/049 |
| | | | 706/25 |
| 2015/0106315 | A1 | 4/2015 | Birdwell et al. |
| 2015/0106316 | A1* | 4/2015 | Birdwell ............... G06N 3/063 |
| | | | 706/33 |
| 2015/0242743 | A1 | 8/2015 | Esser et al. |
| 2015/0278685 | A1 | 10/2015 | Zheng et al. |
| 2016/0034812 | A1* | 2/2016 | Gibson .................... G06N 3/08 |
| | | | 706/25 |
| 2016/0086075 | A1 | 3/2016 | Alvarez-Icaza Rivera et al. |

OTHER PUBLICATIONS

Schmiedt et al.—2010—"Spike timing-dependent plasticity as dynamic filter"—https://www.researchgate.net/publication/221617899_Spike_timing-dependent_plasticity_as_dynamic_filter (Year: 2010).*

Andrew Smith—"Synaptic Weight Modification and Storage in Hardware Neural Networks"—2012—http://citeseerx.ist.psu.edu/viewdoc/download?doi=10.1.1.426.9951&rep=rep1&type=pdf (Year: 2012).*

Park et al.—"Electronic system with memristive synapses for pattern recognition"—May 5, 2015—https://www.ncbi.nlm.nih.gov/pmc/articles/PMC4419523/ (Year: 2015).*

Rast et al.—"The Leaky Integrate-and-Fire Neuron: A Platform for Synaptic Model Exploration on the SpiNNaker Chip"—2010—https://ieeexplore.ieee.org/stamp/stamp.jsp?tp=&arnumber=5596364 (Year: 2010).*

Niebur et al.—"A Generalized Linear Integrate-and-Fire Neural Model Produces Diverse Spiking Behaviors"—2010—https://www.ncbi.nlm.nih.gov/pmc/articles/PMC2954058/ (Year: 2010).*

List of IBM Patents or Patent Applications Treated as Related.

Arthur, et al., "Building Block of a Programmable Neuromorphic Substrate: A Digital Neurosynaptic Core", IEEE International Joint Conference on Neural Networks, Jun. 2012, 8 pages.

Azghadi, et al., "Spike-Based Synaptic Plasticity in Silicon: Design, Implementation, Application, and Challenges", Proceedings of the IEEE, May 2014, pp. 717-737, vol. 102, No. 5.

Merolla, et al., "A Digital Neurosynaptic Core Using Embedded Crossbar Memory with 45pJ per Spike in 45nm", IBM Research, Sep. 2011 pp. 1-4.

Wu, et al., "Homogeneous Spiking Neuromorphic System for Real-World Pattern Recognition", IEEE Journal on Emerging and Selected Topics in Circuits and Systems, Jun. 2015, pp. 1-13, vol. 5, No. 2.

Wu, et al., "A CMOS Spiking Neuron for Brain-Inspired Neural Networks with Resistive Synapses and In-Situ Learning", IEEE Transactions on Circuits and Systems-II: Express Brief, May 2015, 6 pages.

U.S. Office Action issued in U.S. Appl. No. 15/168,959, dated Jan. 24, 2019, pp. 1-16.

Jin, X. et al., "Implementing Spike-Timing-Dependent Plasticity on SpiNNaker Neuromorphic Hardware" IEEE (Oct. 2010) pp. 1-8.

Kim, Y. et al., "A Digital Neuromorphic Vlsi Architecture With Memristor Crossbar Synaptic Array for Machine Learning" IEEE International SOC Conference (Sep. 2012) pp. 328-333.

U.S. Office Action issued in U.S. Appl. No. 14/980,505, dated Feb. 11, 2019, pp. 1-53.

Frank, "An Accelerator for Neural Networks with Pulse-Coded Model Neurons", IEEE Transactions on Neural Networks, vol. 10, No. 3, May 1999, pp. 527-538.

Merolla, "A Digital Neuro-Synaptic Core Using Embedded Crossbar Memory with 45pJ per Spike in 45nm", IEEE Custom Integrated Circuit Conference, Sep. 2011, 4 pages.

U.S. Office Action issued in U.S. Appl. No. 15/168,959 dated May 29, 2019, 13 pages.

U.S. Office Action issued in U.S. Appl. No. 14/980,295 dated May 31, 2019, 20 pages.

Wang, "A Neuromorphic Implementation of Multiple Spike-timing Synaptic Plasticity Rules for Large-Scale Neural Networks", Frontiers in Neuroscience, May 2015, 17 pages.

U.S. Office Action issued in U.S. Appl. No. 15/168,959 dated Nov. 14, 2019.

* cited by examiner

LUT BASED SYNAPSE WEIGHT UPDATE SCHEME IN STDP NEUROMORPHIC SYSTEMS

BACKGROUND

Technical Field

The present invention relates to neuromorphic systems and more particularly to updating synapse weight values in Spike Time Dependent Plasticity neuromorphic systems.

Description of Related Art

Neuromorphic systems with a Spike Time Dependent Plasticity (STDP) model are often simulated with software in which the system can be described in a simple mathematical model. This process, however, often takes a large amount of time to compute and, even with a simple model, is time-consuming.

Operations can be achieved much faster (approximately $10^3$ times or more) with the implementation of hardware. This implementation enables larger numbers of learning cycles to be computable within a practical operation timeframe and on a real-time on-system (i.e., an on-chip for a neuromorphic chip) learning.

One of the key steps needed to implement a chip with an on-chip self-learning function is the ability to implement a Synapse Weight (SW) update function. This SW update function requires a special scheme to implement the corresponding simple models in hardware because a biological synapse has a complicated function and its electrical model needs a large number of parameters to be able to emulate it.

In a conventional system, SW values of target synapses are calculated with a complicated software program functioning in the background and loaded into a system. For the STDP model, the difference of the spike arrival time from the pre-neuron and from the post-neuron is converted into an update amount of the SW values. However, such conventional schemes have drawbacks. Real-time on-system (on-chip) learning cannot be implemented using the conventional scheme because the time it takes to calculate and load the SW values is relatively long. Additionally, using the conventional scheme, the SW update resolution cannot be increased very much since the shape of the spike is a simple digital pulse, such as a square wave. Furthermore, using the conventional scheme, the software program for calculating the next SW values is so complicated that an end user cannot exploit it without learning special skills or know-how.

SUMMARY

According to an aspect of the present principles, a method for updating synapse weight values of a Spike Time Dependent Plasticity model in a neuromorphic system is provided. The method includes selectively performing, by a hardware-based synapse weight incrementer or decrementer, one of a synapse weight increment function or decrement function, each using a respective lookup table, to generate updated synapse weight values responsive to spike timing data. The method further includes storing the updated synapse weight values in a memory. The method additionally includes performing, by a hardware-based processor, a learning process to integrate the updated synapse weight values stored in the memory into the Spike Time Dependent Plasticity model neuromorphic system for improved neuromorphic simulation.

According to an aspect of the present principles, a system is provided for updating synapse weight values in a Spike Time Dependent Plasticity model. The system includes at least one of a hardware-based synapse weight incrementer and a hardware-based synapse weight decrementer, each respectively configured to perform either a synapse weight increment function or a synapse weight decrement function, using a respective lookup table, to generate updated synapse weight values in response to spike timing data. The system further includes a memory configured to store the updated synapse weight values. The system additionally includes a hardware-based processor configured to perform a learning process to integrate the updated synapse weight values stored in the memory into the Spike Time Dependent Plasticity model neuromorphic system for improved neuromorphic simulation.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention implement a scheme to update Synapse Weight (SW) values in a Spike Time Dependent Plasticity (STDP) system using a precise and effective SW update function for a digital STDP neuromorphic system in hardware. The scheme implements an SW increment and decrement function with two independent blocks: a Synapse Weight Decrement (SWD) block; and a Synapse Weight Increment (SWI) block. The SWD and SWI blocks receive spike timing data and control signals in a special timing sequence to generate updated SW values from current SW values.

In an embodiment of the present principles, the scheme includes a Lookup Table (LUT) in both blocks. By introducing the LUT in both the SWI and SWD blocks, the next SW values can be calculated without a complicated calculation. The operation with the LUT increases the speed at the system in which complicated system behavior is implemented.

The scheme is based on a fully digital circuit, and can be implemented with a Field-Programmable Gate Array (FPGA) or a programmable logic device. Furthermore, LUTs can be updated flexibly for system parameter fitting.

According to the present principles, an SW update scheme based on the STDP model can be implemented with high accuracy. The SW update scheme can be implemented easily by loading data obtained from a hardware measurement into two (increment and decrement) LUTs. Furthermore, with this scheme, a developer does not have to analyze or understand a complicated synapse update algorithm.

In an embodiment of the present principles, a chip with an on-chip self-learning function is implemented. One of the key steps needed to implement a chip with an on-chip self-learning function is the ability to implement an SW update function. In an embodiment of the present principles, the system is able to implement such an SW update function.

Using the present scheme, performance can be free from Process, Voltage, and Temperature (PVT) variation and can achieve a good model hardware configuration, unlike when using an analog implementation. This enables a user to implement an accurate system quickly with reconfigurable logic, such as an FPGA.

Figure 1:
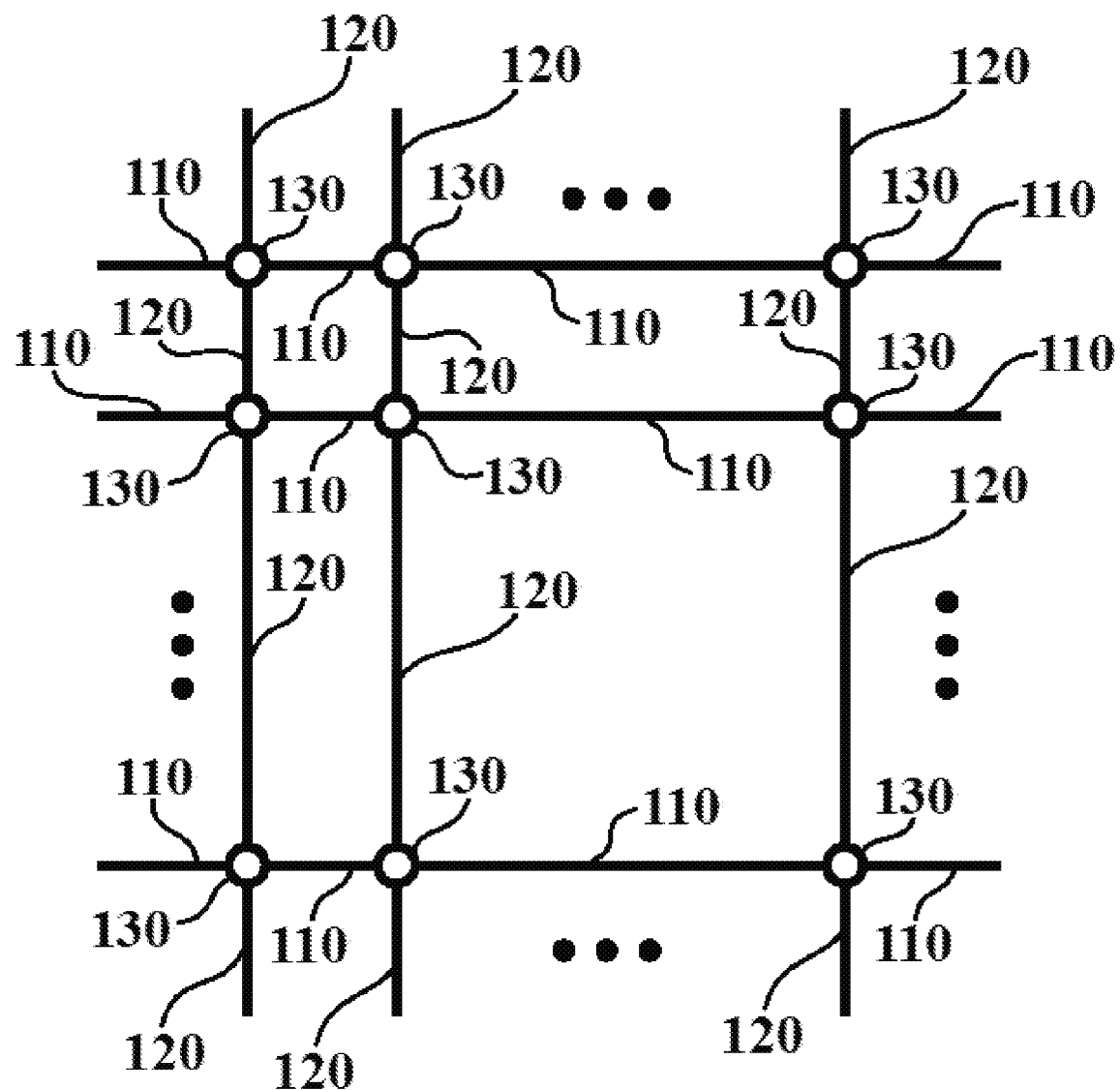
FIG. 1 is diagram of synapses 130 having a crossbar structure, in accordance with an embodiment of the present principles.

Referring to the drawings in which like numerals represent the same or similar elements and initially to FIG. 1, a diagram of synapses 130 having a crossbar structure is shown.

In a typical neuromorphic system, a synapse 130 is connected between an axon 110 of a neuron (a pre-neuron) and a dendrite 120 of another neuron (a post-neuron). Thus, herein, axons 110 are shown horizontally and dendrites 120 are shown vertically in the crossbar structure. Each synapse 130 has its own SW value, which shows the strength of the connection. In the STDP model, the SW values are updated with the timing between (1) an axon 110 spike from the pre-neuron, and (2) a dendrite 120 spike from the post-neuron. In the present scheme, synapses 130 are assumed to have a crossbar structure. However, other types of synapse structures may be used in connection with the present principles. In a crossbar structure, the axons 110 and dendrites 120 are perpendicular to each other and the two 110, 120 cross at the synapses 130.

Figure 2:
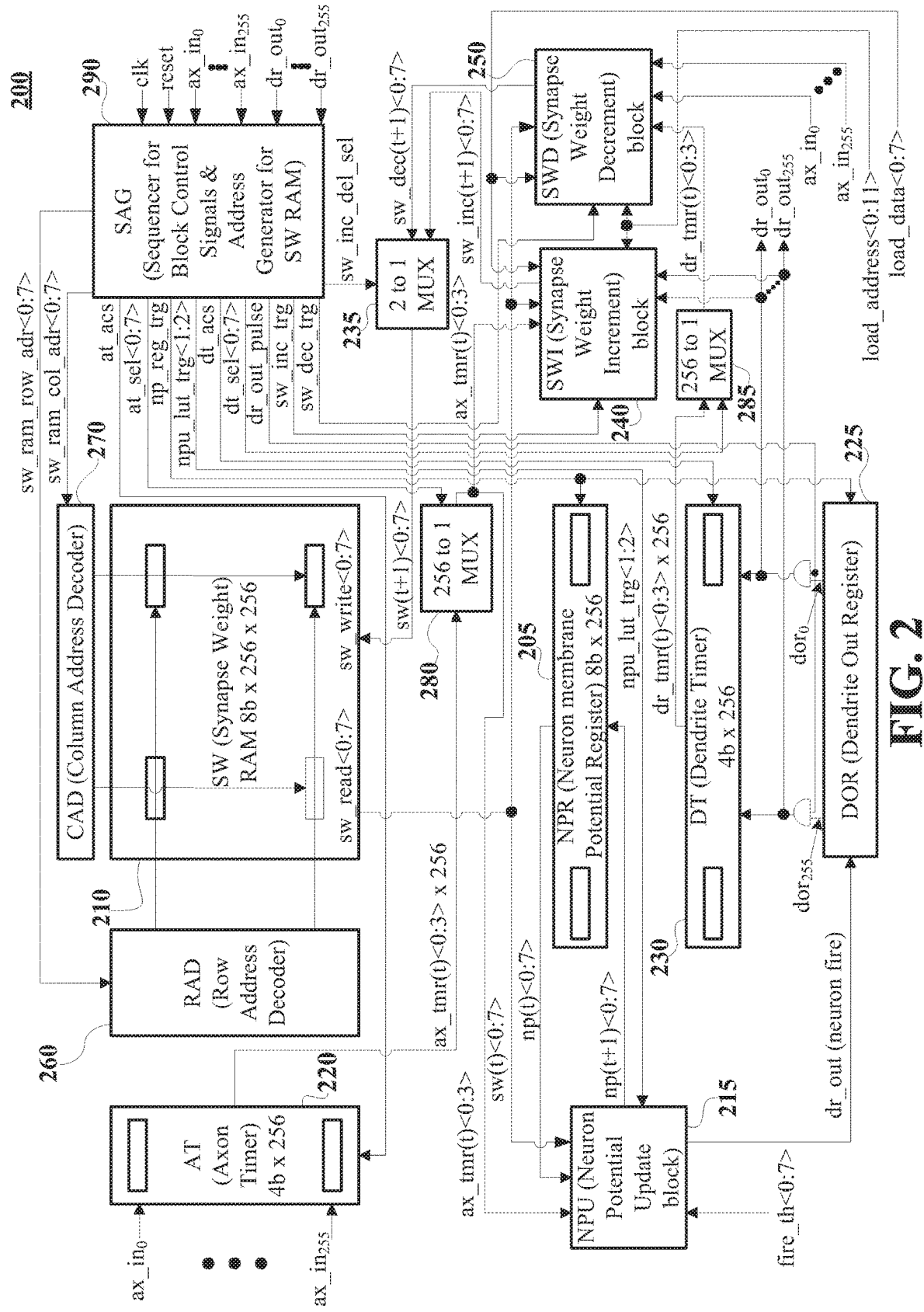
FIG. 2 is a block diagram of an exemplary neuromorphic system 200, in accordance with an embodiment of the present principles.

Referring now to FIG. 2, a block diagram of an exemplary neuromorphic system 200 is shown.

In this system 200, synapse devices with a crossbar structure are implemented with SW Random Access Memory (RAM) 210. In one example, there is a configuration with 256 neurons and $256^2$ (65536) synapses. The number of neurons, however, can be any number and can be modified according to the target application. The SW data for these synapses is stored in the SW RAM 210 in, for example, 8 bit each. The raw and column of the SW RAM 210 correspond to the axon and neuron body (or dendrite), respectively. That is, in one example, the SW RAM (i, j) 210 (or $SW_{i,j}$) (for i, j=0 to 255) shows the SW value of the synapse between axon i and dendrite j (or neuron body j).

Spike timing at the axon and at the dendrite (or neuron body) has to be monitored. This is due to the fact that the timing difference between the axon and the dendrite is one of the most important parameters in the STDP model. Thus, this scheme expects timing information for the axon spike and the dendrite spike to be obtained and monitored. One way to supply this information is to use an Axon Timer (AT) 220 and a Dendrite Timer (DT) 230. These timers 220, 230 provide elapsed times since a spike is given to the axon nodes and the dendrite nodes of the synapses, respectively. AT access signals, at_acs, and DT access signals, dt_acs, are activated when the ATs and DTs, respectively, are accessed for read. The lengths of the AT 220 and the DT 230 are, for example, in 4 bits. However, these lengths can be determined according to the target application. For example, the at_sel<0:7> are 8 bit AT selection signals which select one AT value which is used for the SWI out of the 256 ATs. Additionally, the dt_sel<0:7> are 8 bit DT selection signals which select one DT value which is used for the SWD out of the 256 DTs. The AT 220 and DT 230 work like a decrement counter and are preset at the spike-in timing.

The STDP model uses the spike timing information for the SW update operation. The SWI block 240 increments the SW values and the SWD block 250 decrements the SW values, respectively. LUTs are used in SWI 240 and SWD 250 blocks. In an embodiment of the present principles, the contents of these LUTs are prepared based on the simulation or hardware measurement results. In another embodiment, the contents are pre-loaded into each LUT with the load_address<0:11> and load_data<0:7> signals shown in FIGS. 4 and 7. There is a large amount of data in the LUTs, and, if all of the data for the LUT is acquired, the data can be loaded in these LUTs. However, if there is any missing data in the measurement or simulation for the LUTs, the missing data can be calculated with interpolation or extrapolation using existing data. In addition to the measurement and the simulation, the contents of the LUTs can be supplied with equations or a mixture of them.

The increment and decrement amounts of the SW values can be determined with current AT 220, DT 230, and SW values. A Row Address Decoder (RAD) 260 and a Column Address Recorder (CAD) 270 decode row and column addresses for the SW RAM 210. The RAD 260 and CAD 270 are used for read and write access to the SW RAM 210. For the read access, the current SW value, sw(t)<0:7> is taken at read data output ports sw_read<0:7>, and for the write access, the next SW value, sw(t+1)<0:7> is given at write data input ports sw_write<0:7>. This value replaces current SW value sw(t)<0:7> in the write access. In an embodiment of the present principles, there is a configuration that has 256 ATs 220 and 256 DTs 230. However, the number of ATs 220 and DTs 230 can be modified to the target application. In this configuration, an AT 220 and a DT 230 are assigned to each axon and dendrite, one by one. For the time-sharing serial operation at the SWI 240 and SWD 250 blocks, a 256 to 1 Multiplexor (MUX) 280 is used to select one of the AT 220 data out of the 256 AT 220 data. This is also true of the 256 to 1 MUX 285 for the DT 230 data. The AT 220 data value is ax_tmr(t)<0:3> and the DT 230 data value is dr_tmr(t)<0:3>. A 2 to 1 MUX 235 selects one of the results from either the SWD block 250 or the SWI block 240 which is to be written to the SW RAM 210 as updated SW data. A Sequencer for block control signals & Address Generator for SW RAM (SAG) 290 implements the timing sequence generating trigger or the control (select) signals to the other blocks. This block 290 has clock (clk) and reset inputs and generates row and column address signals (sw_ram_row_adr<0:7> and sw_ram_col_adr<0:7>, respectively) for the SW RAM 210.

Additionally, the SAG 290 sends a neuron membrane potential register trigger signal, np_reg_trg to a Neuron membrane Potential Register (NPR) 205, which stores data on the Neuron membrane Potential (NP) in, for example, 8 bit each. The SAG 290 further sends an LUT trigger signal, npu_lut_trg<1:2>, for NP update to a Neuron membrane Potential Update block (NPU) 215. In the NPU 215, an NP value is updated with spike input (Axon Input) timing (ax_tmr(t)<0:3>), SW values for corresponding synapses (sw(t)<0:7>), and the current NP value (np(t)<0:7>). The updated NP value, np(t+1)<0:7>, is then sent to the NPR 205. The NPU 215 further checks whether the NP reaches a certain threshold level to generate a fire signal (fire_th<0:7>). The NPU implements this operation with the leaky decay of the NP. These operations are called Leaky Integrate and Fire (LIF) operations. In order to implement the LIF function, the NPU receives input signals for the current AT 220, SW and NP values. The NPU then applies the leaky decay effect and generates the output signal for the next NP value.

The dr_out_pulse signal is used to generate signals, dr_out$_0$-dr_out$_{255}$, from original signals, dor$_0$-dor$_{255}$. Furthermore, in a Dendrite Output Register (DOR) 225, a serial to parallel conversion of Dendrite Output (or Neuron Fire) signals is achieved. This may be needed because internal signals are processed in a serial manner, while the external interface is processed in a parallel manner. The DOR 225 converts a serial signal, dr_out (neuron fire), to parallel signals (dor$_0$ to dor$_{255}$) to give parallel input to the synapse or the axon of the next synapse.

In an embodiment of the present principles, the SW update is achieved together with the NP update. In this embodiment, the SW values and the NP values can be updated simultaneously.

In an embodiment of the present principles, the system is able to switch from a learning mode to a non-learning mode via an internal switch. This switching capability can be used to enable the accumulation of information and/or data before a functional operation is performed.

Figure 3:
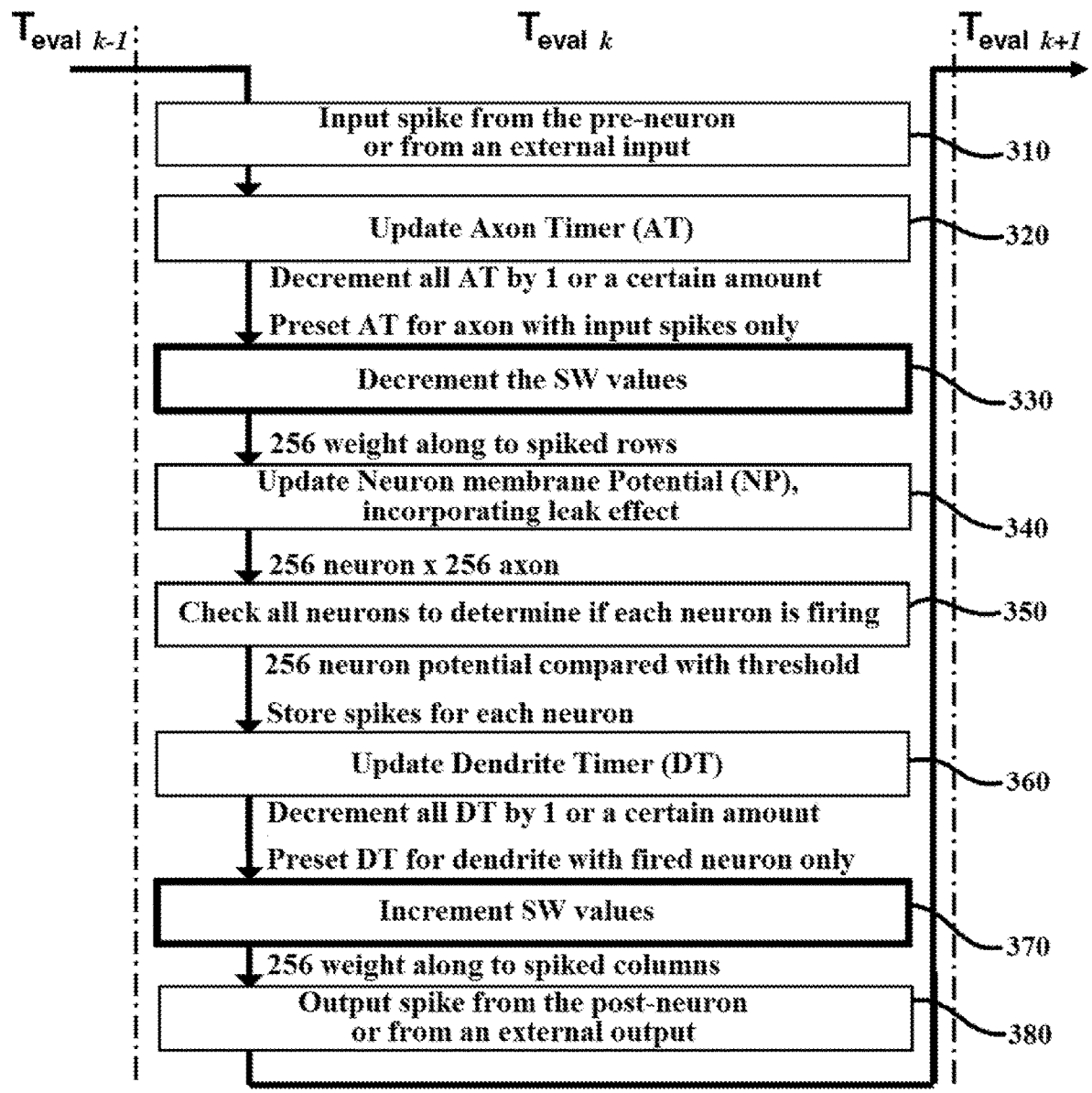
FIG. 3 is a sequence for the operation of the neuromorphic system, in accordance with an embodiment of the present principles.

Referring now to FIG. 3, a sequence for the operation of the system is shown. In this figure, evaluation time cycles $T_{eval\ k-1}$, $T_{eval\ k}$ and $T_{eval\ k+1}$ are shown. The timing sequence for $T_{eval\ k}$, which is described in detail, is repeated, so the other evaluation time cycles, such as $T_{eval\ k-1}$ and $T_{eval\ k+1}$, have completely the same sequences. At $T_{eval\ k}$, the sequence progresses from top to bottom. The sequence begins at step 310.

At step 310, a spike is input from the pre-neuron or from an external input.

At step 320, once the axon spike is inputted, the AT is updated, during which all AT times are decremented by 1 or a certain amount and the AT is preset for axons with input spikes only.

At step 330, the SWD block decrements the SW values. In an embodiment of the present principles, the decrement amount is determined using the current DT and SW values.

At step 340, the NP is updated while incorporating the leak effect. During this step, the NPU receives input signals for the current AT, SW, and NP values. The NPU then applies the leaky decay effect and generates the output signal for the next NP value.

At step 350, all of the neurons are checked in order to determine whether or not each of the neurons fires or not. In an embodiment of the present principles, the NPU checks whether the NP reaches a certain threshold level to generate a fire signal (fire_th<0:7>).

At step 360, the DT is updated, during which all DT times are decremented by 1 or a certain amount and the DT is preset for dendrites with fired neurons only.

At step 370, the SWI block increments the SW values. In an embodiment of the present principles, the increment amount is determined using the current AT and SW values.

In one embodiment, there is only one 8-bit write port for SW RAM. The sw_inc_dec_sel signal selects an updated (incremented) SW value, sw_inc(t+1)<0:7>, or an updated (decremented) SW value, sw_dec(t+1)<0:7>, to be written into the SW RAM. If the system is on step 330, the sw_inc_dec_sel signal is Low. If the system is on step 370, the sw_inc_dec_sel signal is High.

At step 380, a spike is output from the post-neuron or from an external output.

Figure 4:
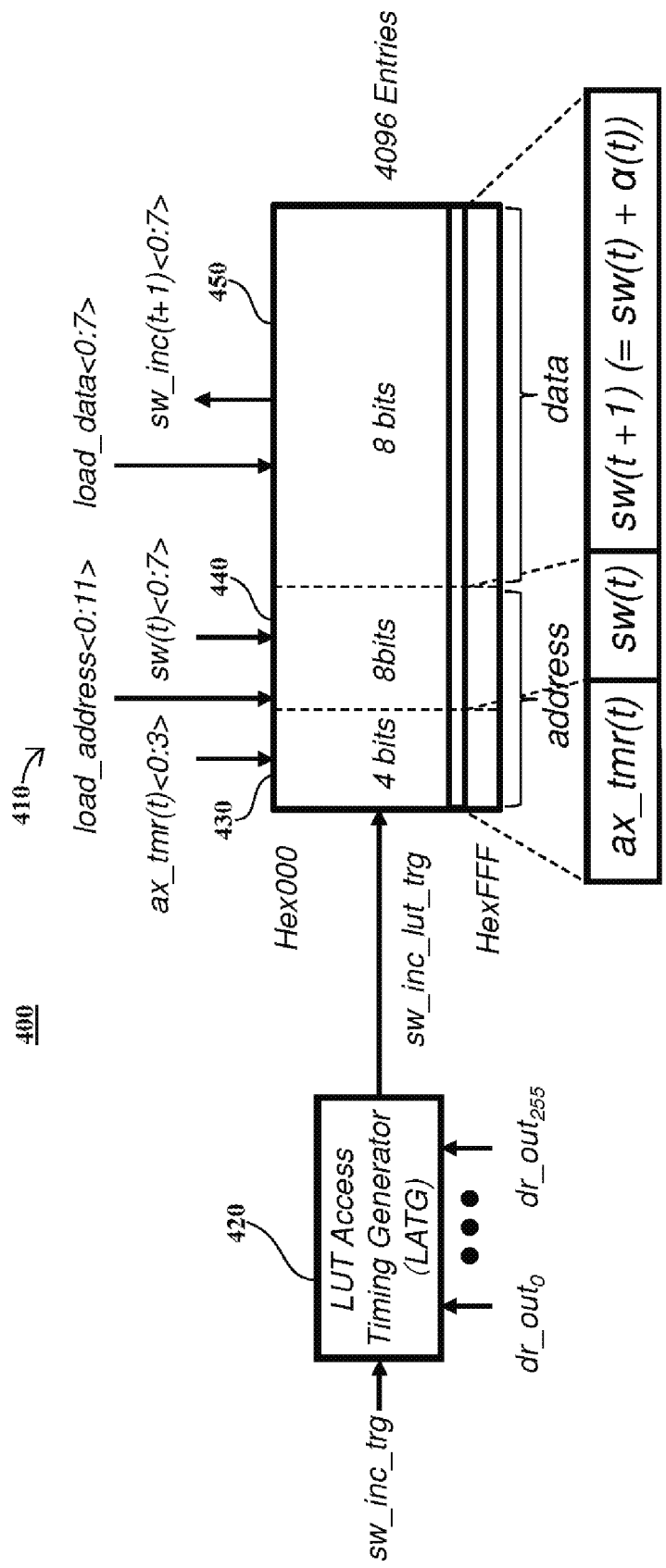
FIG. 4 is a block diagram of an exemplary Synapse Weight Increment block 400, which corresponds to SWI block 240 in FIG. 2, in accordance with an embodiment of the present principles.

Referring now to FIG. 4, a block diagram of an exemplary SWI block 400 is shown. This block 400 consists of an LUT 410 for an SWI and an LUT Access Timing Generator (LATG) 420. The LATG 420 generates an LUT access (or trigger) signal (sw_inc_lut_trg) from sw_inc_trg input signal and dr_out$_j$ (j=0 to 255) (neuron fire) signals. The LUT 410 has address input ports 430 for the AT value (ax_tmr(t)<0:3>) and address import ports 440 for the current SW value (sw(t)<0:7>). It also has data output ports 450 for the updated (incremented) SW value (sw_inc(t+1)<0:7>). The LUT data can be loaded (written) with load_address<0:11> and load_data<0:7> before operation. In this example, the length of the address input data (ax_tmr(t)<0:3> & sw(t)<0: 7>) is 12 (=4+8) bits and the length of the output data (sw_inc(t+1)<0:7>) is 8 bits.

Figure 5:
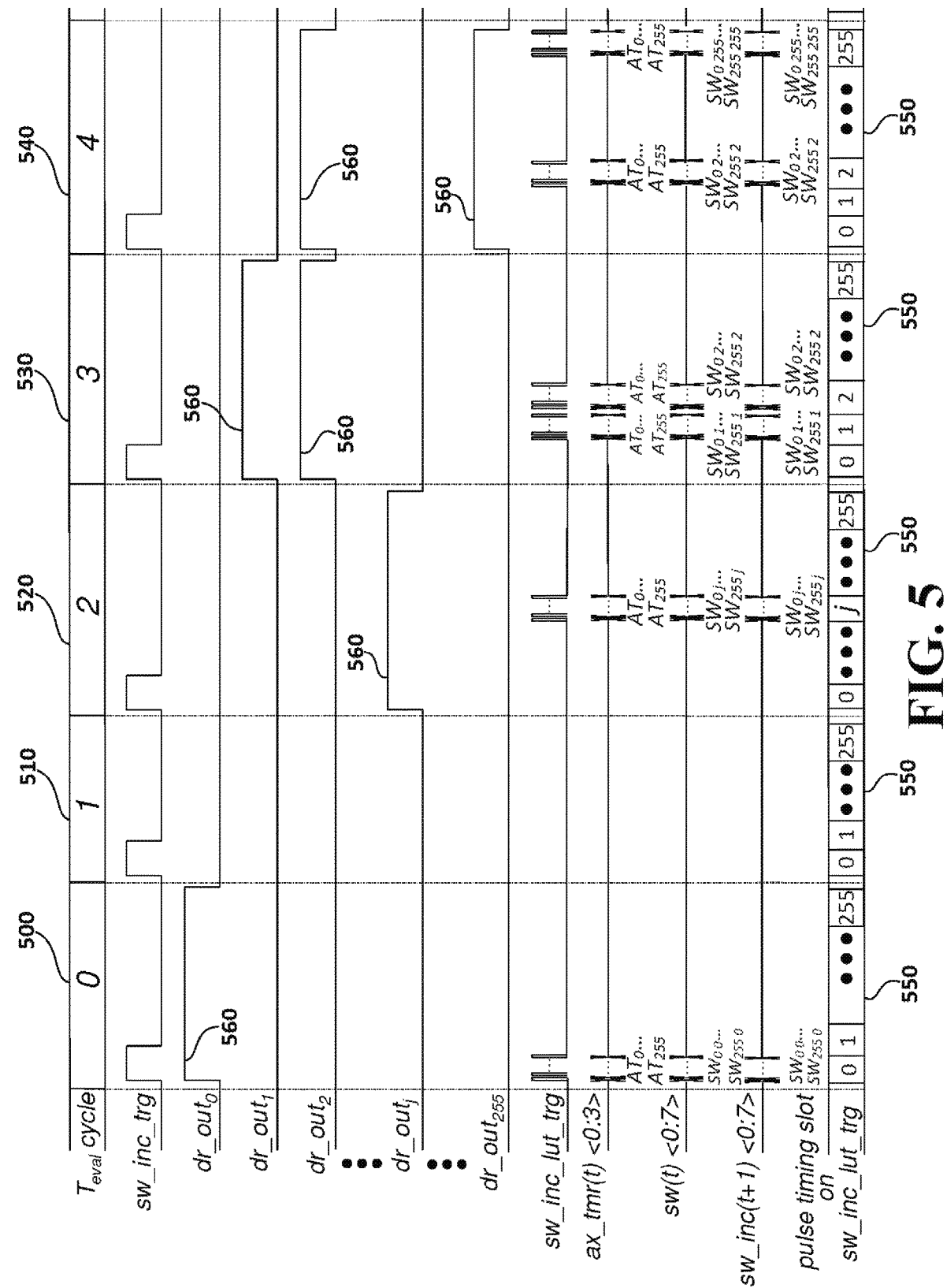
FIG. 5 is a timing diagram for the operation of a Synapse Weight Increment block, in accordance with an embodiment of the present principles.

Referring now to FIG. 5, a timing diagram for the operation of an SWI block over $T_{eval}$ cycles 0 to 4, 500, 510, 520, 530 and 540, respectively, is shown. When there is a spike 560 at the dr_out, input and the sw_inc_trg signal is activated, the LATG generates time pulses on the sw_in-c_lut_trg signal at pulse timing slot j. In an embodiment of the present principles, the LATG generates 256 pulses on the sw_inc_lut_trg signal at pulse timing slot j (j=0 to 255) 550. This pulse timing slot corresponds to the column of SW values to be updated (incremented). In this example, dr_out$_0$ has a spike 560 in $T_{eval}$ cycle 0 500. Thus, in this configuration, there are 256 pulses on the sw_inc_lut_trg signal at pulse timing slot 0. At the same time, ax_tmr(t)<0:3> for AT$_i$ (i=0 to 255) and sw(t)<0:7> for SW$_{i0}$ (i=0 to 255) are supplied from external blocks (AT,SW RAM, RAD,CAD and SAG in FIG. 2). There is no dr_out spike 560 in $T_{eval}$ cycle 1 510. Thus there is no pulse on the sw_inc_lut_trg signal during this cycle. In $T_{eval}$ cycle 2 520, there is a spike

560 at the dr_out$_j$ signal. Thus, in this configuration, 256 pulses are generated on the sw_inc_lut_trg signal at pulse timing slot j. In T$_{eval}$ cycles 3 530 and 4 540, there are spikes 560 at multiple dr_out$_j$ (j=0 to 255) signals. In the T$_{eval}$ cycle 3 530, there are spikes 560 at the dr_out$_1$ and dr_out$_2$ signals. In T$_{eval}$ cycle 4 540, there are spikes 560 at the dr_out$_2$ and dr_out$_{255}$ signals. That is, for the T$_{eval}$ cycles 3 530 and 4 540, a multiple (2) of the 256 pulses are generated on the sw_inc_lut_trg signal at multiple pulse timing slots of "1 and 2" and "2 and 255," respectively.

Figure 6:
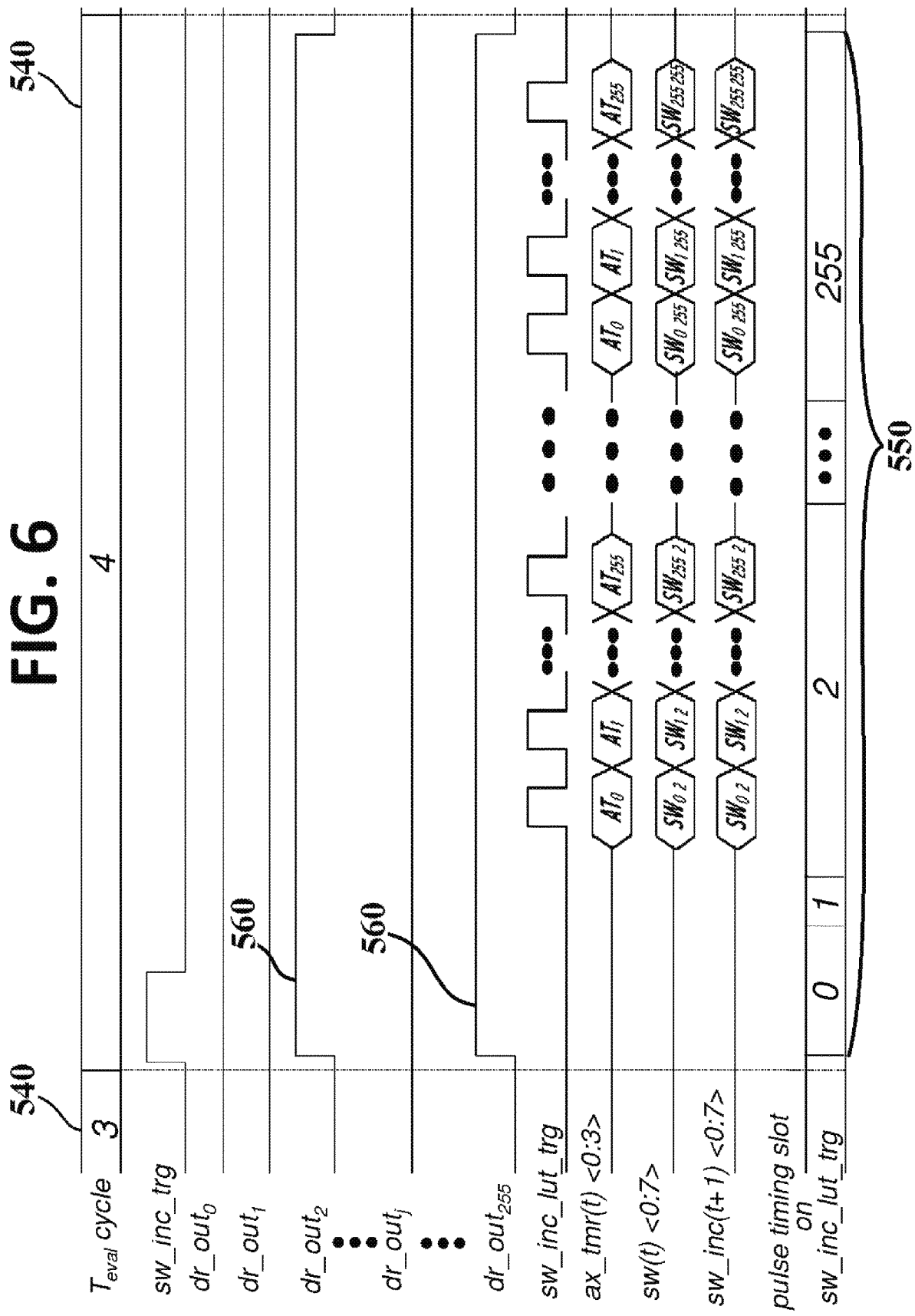
FIG. 6 is a magnified timing diagram around Teal cycle 4, initially shown in FIG. 5, in accordance with an embodiment of the present principles.

Referring now to FIG. 6, a magnified timing diagram of T$_{eval}$ cycle 4 540 in FIG. 5 is shown. This figure shows transferred data for ax_tmr(t)<0:3>, sw(t)<0:7>, and sw_inc (t+1)<0:7> in detail.

Figure 7:
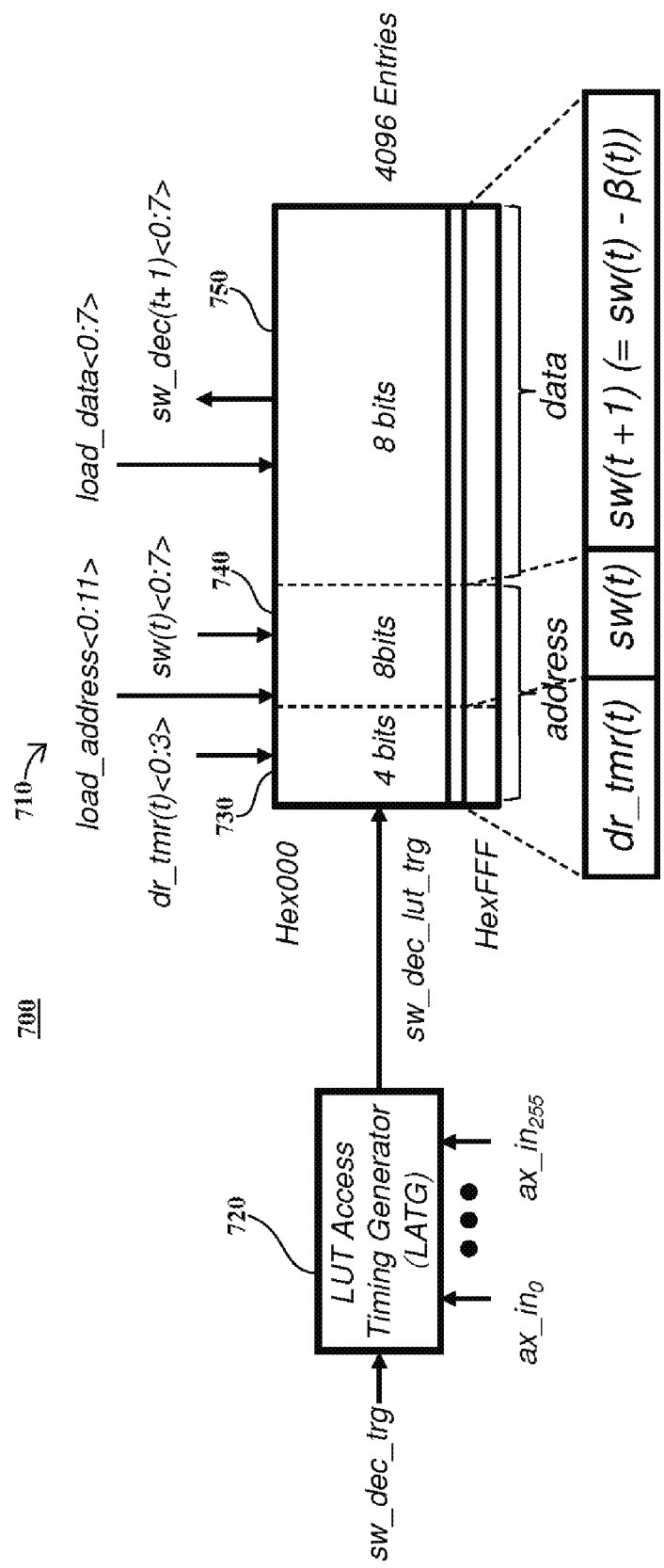
FIG. 7 is a block diagram of an exemplary Synapse Weight Decrement block 700, which corresponds to SWD block 250 in FIG. 2, in accordance with an embodiment of the present principles

Referring now to FIG. 7, a block diagram of an exemplary SWD block 700 is shown. This block 700 consists of an LUT 710 for an SWD and an LATG 720. The LATG 720 generates an LUT access (or trigger) signal (sw_dec_lut_trg) from sw_dec_trg input signal and the ax_in$_i$ (i=0 to 255) signals. The LUT 710 has address input ports 730 for the DT value (dr_tmr(t)<0:3>) and address input ports 740 for the current SW value (sw(t)<0:7>). It also has data output ports 750 for the updated (decremented) SW value (sw_dec(t+1) <0:7>). The LUT data can be loaded (written) with the load_address<0:11> and the load_data<0:7> before operation. In this example, the length of the address input data (dr_tmr(t)<0:3> & sw(t)<0:7>) is 12 (=4+8) bits and the length of the output data (sw_dec(t+1)<0:7>) is 8 bits.

Figure 8:
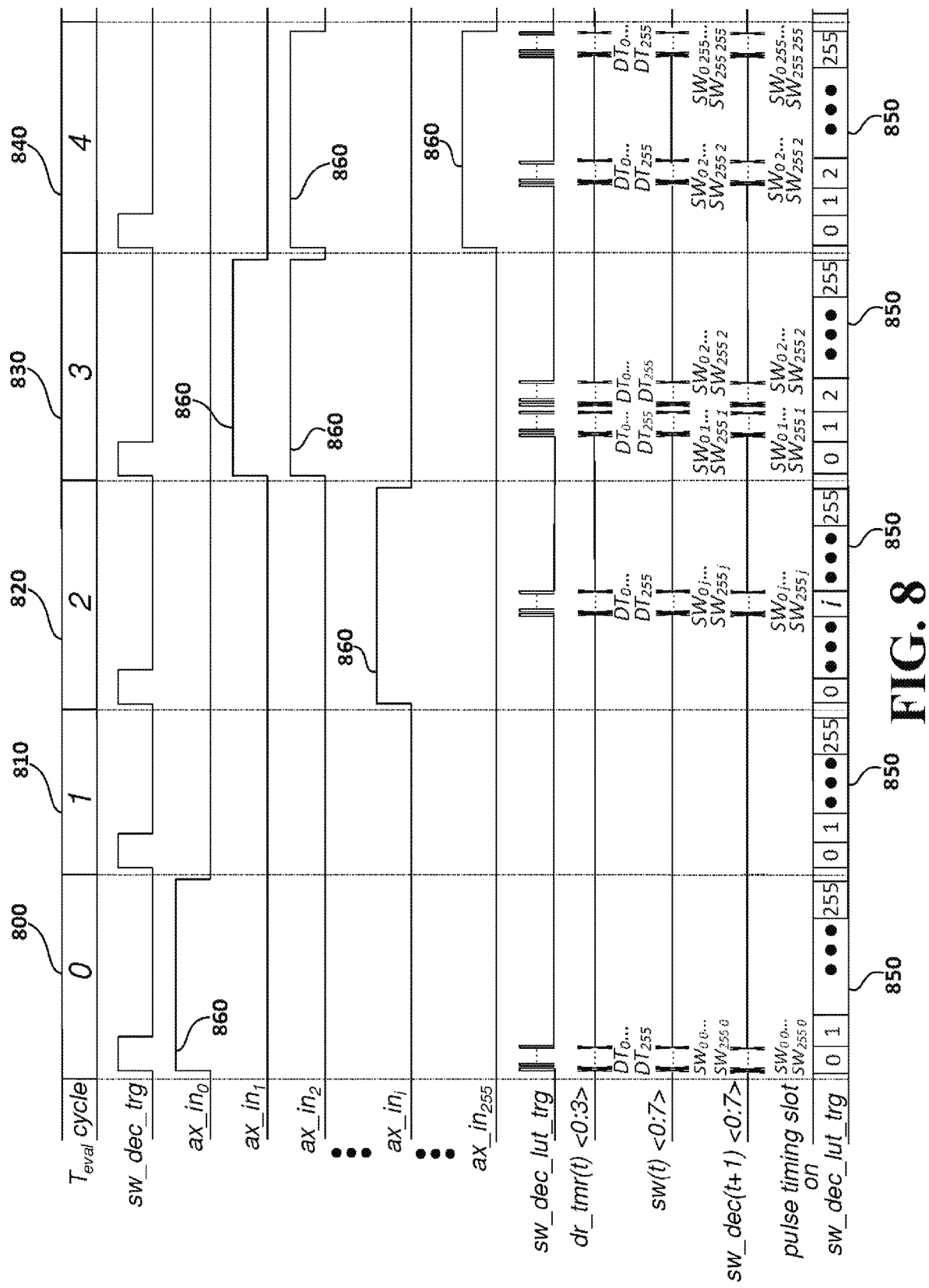
FIG. 8 is a timing diagram for the operation of a Synapse Weight Decrement block, in accordance with an embodiment of the present principles.

Referring now to FIG. 8, a timing diagram for the operation of an SWD block over T$_{eval}$ cycles 0 to 4, 800, 810, 820, 830 and 840, respectively, is shown. When there is a spike 860 at the ax_in, input and the sw_dec_trg signal is activated, the LATG generates times pulses on the sw_dec_lut_trg signal at pulse timing slot i. In an embodiment of the present principles, the LATG generates 256 times pulses on the sw_dec_lut_trg signal at pulse timing slot i (i=0 to 255). This pulse timing slot corresponds to the row of SW values to be updated (decremented). In this example, ax_in$_0$ has a spike 860 in Teal cycle 0 800. Thus, in this configuration, there are 256 pulses on the sw_dec_lut_trg signal at pulse timing slot 0. At the same time, dr_tmr(t)<0:3> for DT$_j$ (j=0 to 255) and sw(t)<0:7> for SW$_{0j}$ (j=0 to 255) are supplied from external blocks (DT,SW RAM, RAD,CAD and SAG in FIG. 2). There is no ax_in spike 860 in T$_{eval}$ cycle 1 810. Thus there is no pulse on the sw_dec_lut_trg signal during this cycle. In T$_{eval}$ cycle 2 820, there is a spike 860 at the ax_in$_i$ signal. Thus, in this configuration, 256 pulses are generated on the sw_dec_lut_trg signal at pulse timing slot i. In T$_{eval}$ cycles 3 830 and 4 840, there are spikes 860 at multiple ax_in signals. In T$_{eval}$ cycle 3 830, there are spikes 860 at the ax_in$_1$ and ax_in$_2$ signals. In T$_{eval}$ cycle 4 840, there are spikes 860 at the ax_in$_2$ and ax_in$_{255}$ signals. That is, for T$_{eval}$ cycles 3 830 and 4 840, a multiple (2) of the 256 pulses are generated on the sw_dec_lut_trg signal at multiple pulse timing slots of "1 and 2" and "2 and 255," respectively.

Figure 9:
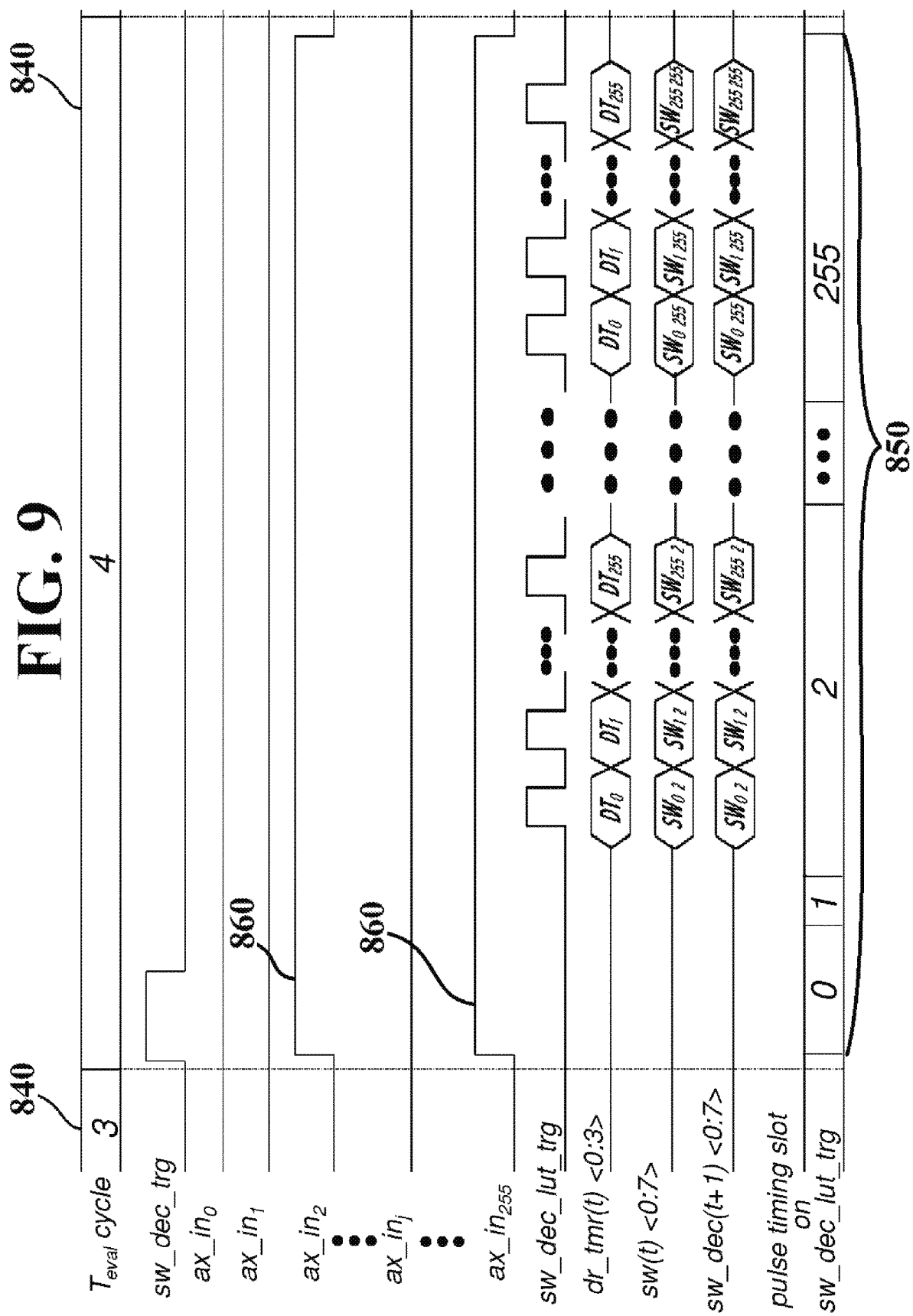
FIG. 9 is a magnified timing diagram around $T_{eval}$ cycle 4, initially shown in FIG. 8, in accordance with an embodiment of the present principles.

Referring now to FIG. 9, a magnified timing diagram around T$_{eval}$ cycle 4 540 in FIG. 8 is shown. This figure shows transferred data for dr_tmr(t)<0:3>, sw(t)<0:7>, and sw_dec (t+1)<0:7> in detail.

Referring now to the LUTs for the SWI block and the SWD block, in one of the embodiments of the present principles, all of the data of an LUT for an SWI block is calculated with equations based on the STDP theory (neither with measurement nor with simulation). The LUT's data is determined with equation 1 (eq. 1), while the delta value (+α(t)) is determined with equation 2 (eq. 2). Eq. 1 is defined as:

$$sw(t+1)=sw(t)+ax\_tmr(t)^2/p*((sw(t)-q)/q)^2)q)^2$$

Eq. 2 is defined as:

$$a(t)=ax\_tmr(t)^2/p*((sw(t)-q)/q)^2q)^2$$

Wherein p and q are optimization parameters for fitting eq. 1 and eq. 2 to actual synapse weight performance. This calculation, with the given equations, can be used for interpolation or extrapolation, too.

In one of the embodiments of the present principles, all of the data of an LUT for an SWD block is calculated with equations based on the STDP theory. The LUT's data is determined with equation 3 (eq. 3), while the delta value (−β(t)) is determined with equation 4 (eq. 4). Eq. 3 is defined as:

$$sw(t+1)=sw(t)-dr\_tmr(t)^2/p*(sw(t)/q)^2$$

Eq. 4 is defined as:

$$\beta(t)=dr\_tmr(t)^2/p*(sw(t)/q)^2$$

Wherein p and q are optimization parameters for fitting the eq. 1 and eq. 2 to actual synapse weight performance. This calculation, with the given equations, can be used for interpolation or extrapolation, too. In this system, the SW is expressed with 8-bit length digital (256 steps) data while the AT and DT values are expressed with 4-bit length data.

The contents of the LUTs can be supplied with delta values between sw(t) and sw(t+1), too. The delta values of the LUT's data for the SWI block shown in FIG. 11 and for the SWD block shown in FIG. 12 are +α(t) and −β(t), respectively.

Figure 10:
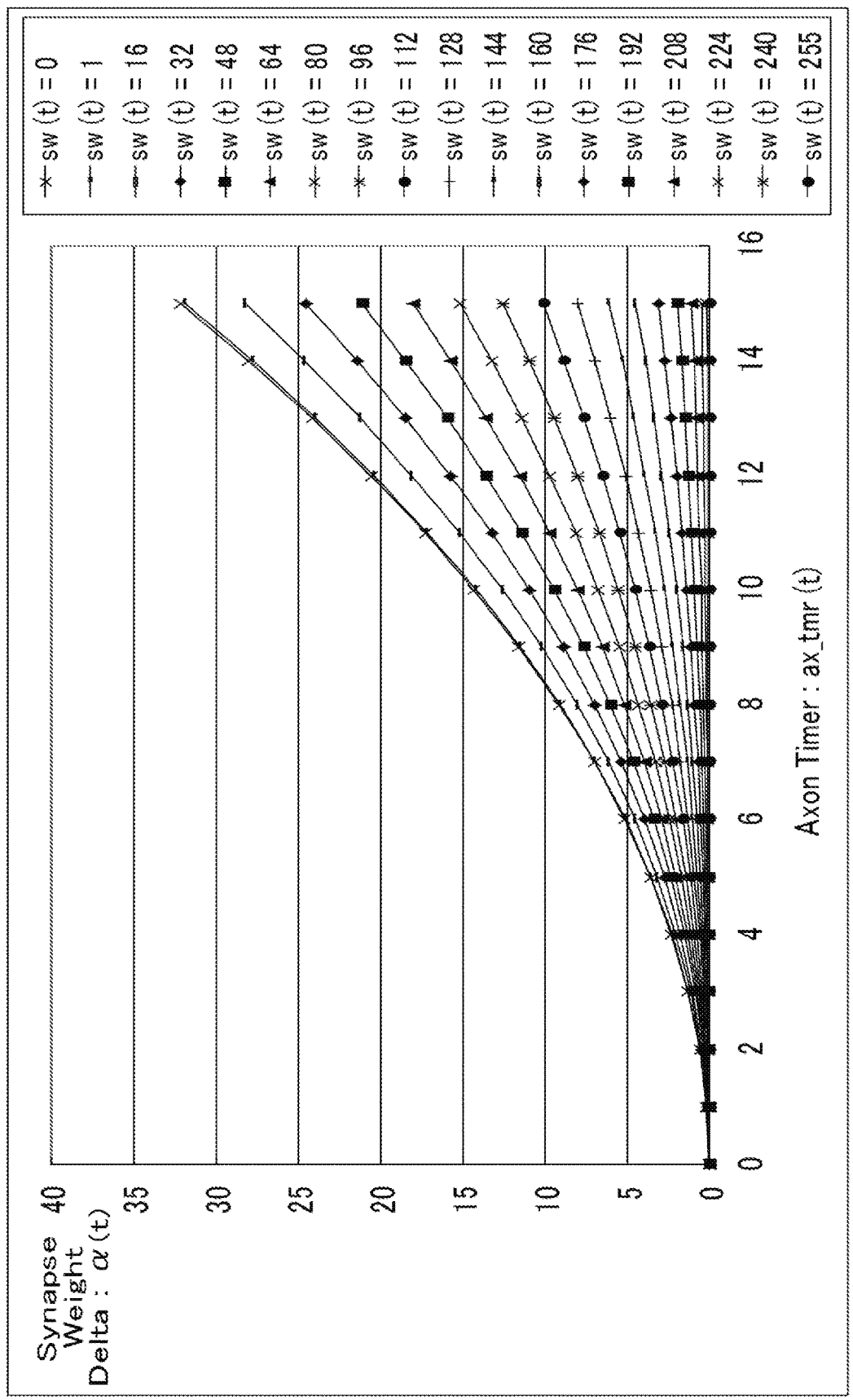
FIG. 10 is a graph representing the delta values for the Synapse Weight Increment block, in accordance with an embodiment of the present principles.
Figure 11:
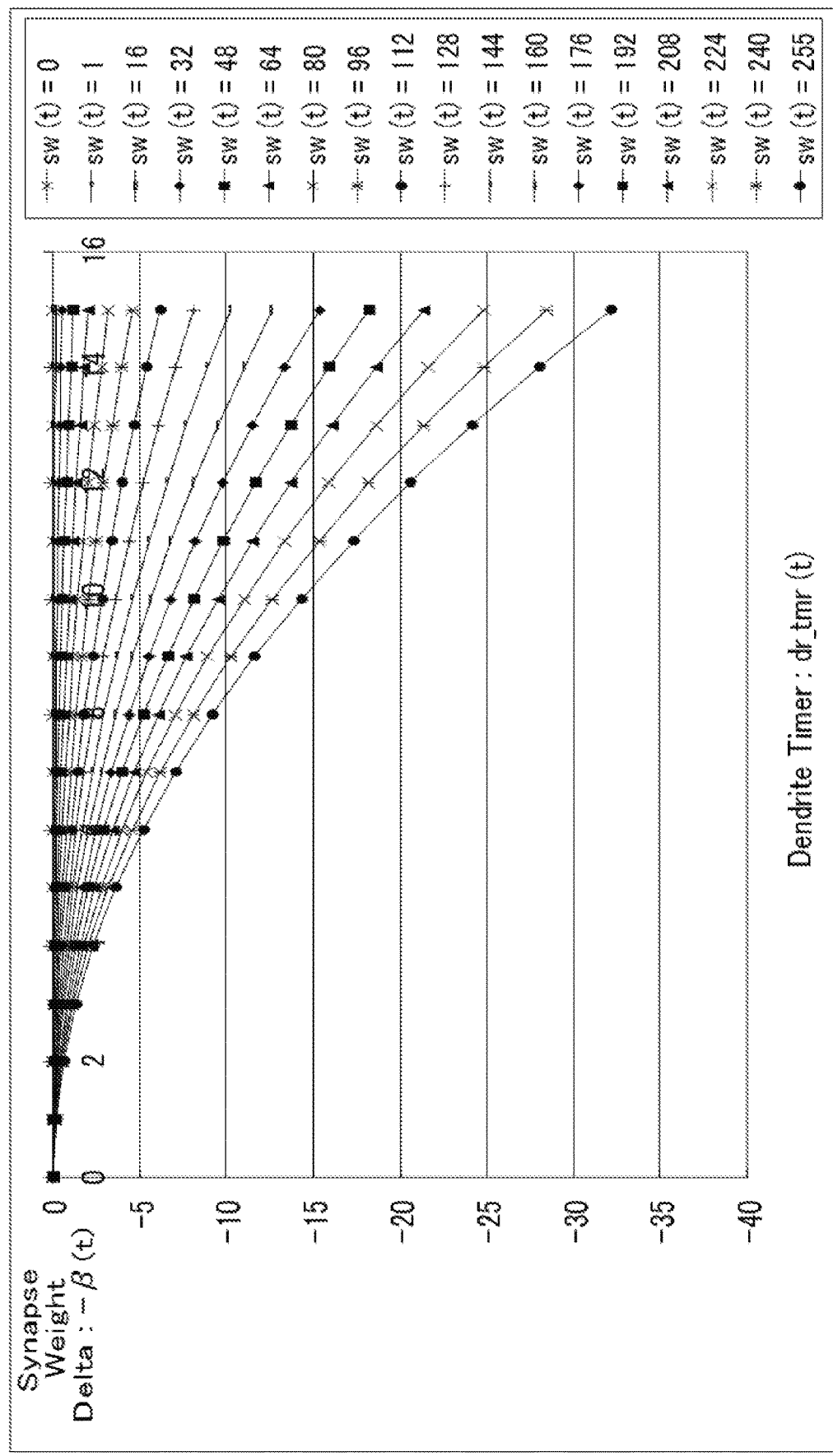
FIG. 11 is a graph representing the delta values for the Synapse Weight Decrement block, in accordance with an embodiment of the present principles.

Referring now to FIGS. 10 and 11, graphs are shown for the delta values for the SWI block and SWD block, respectively. In FIG. 10, the x-axis represents the AT value for time t, ax_tmr(t), and the y-axis represents the SW delta for time t, +α(t). In FIG. 11, the x-axis represents the DT value for time t, dr_tmr(t), and the y-axis represents the SW delta for time t, (−β(t)). In both FIGS. 10 and 11, the SW deltas are represented for SWs of 0, 1, 16, 32, 48, 64, 80, 96, 112, 128, 144, 160, 176, 192, 208, 224, 240, and 255. If the contents of the LUTs are these delta values, both the SWI block and the SWD block need an adder at the output of each LUT. The SWI block and SWD block, with the adder, are shown in FIG. 12 and FIG. 13, respectively.

Figure 12:
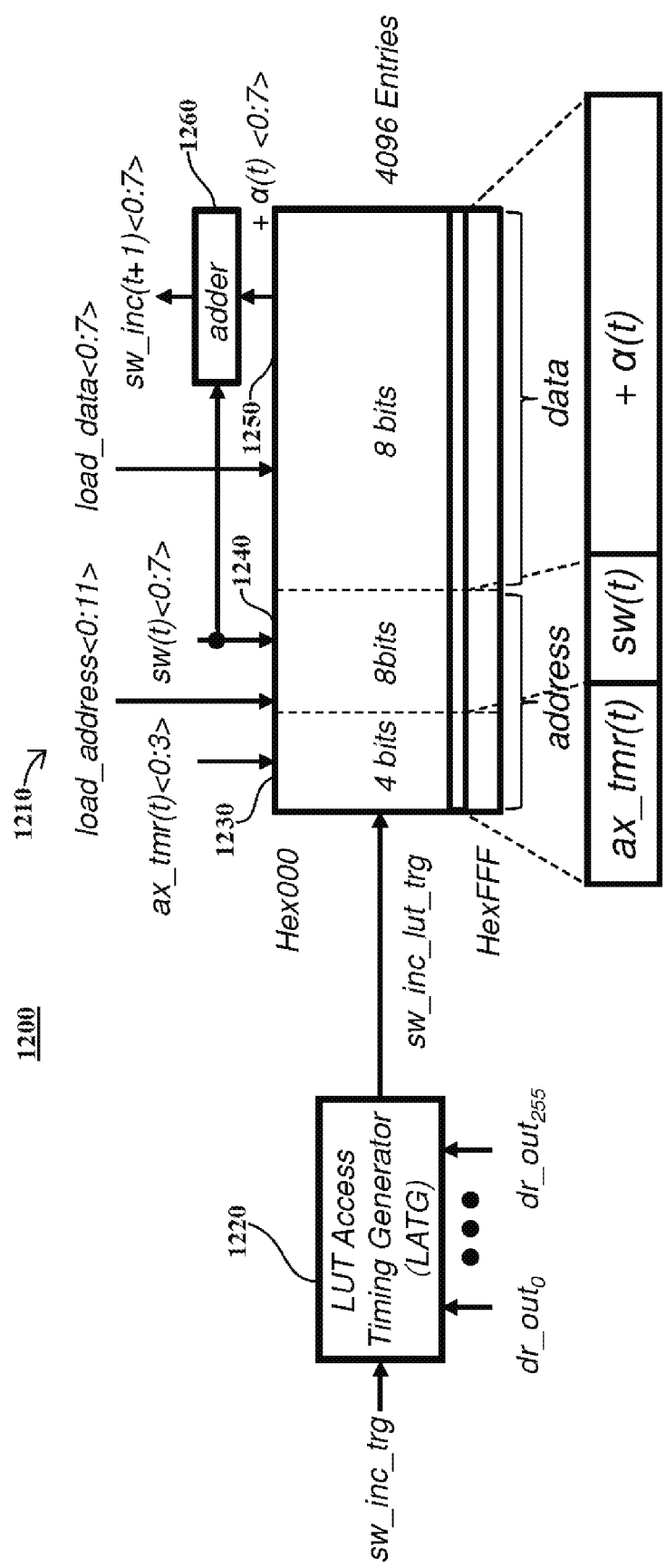
FIG. 12 is a block diagram of a Synapse Weight Increment block 400 using an adder at the output of the lookup table, in accordance with an embodiment of the present principles.

Referring now to FIG. 12, a block diagram of the SWI block 1200 using an adder 1260 at the output of the LUT 1210 is shown. This block 1200 consists of an LUT 1210 for an SWI and an LATG 1220. The LATG 1220 generates an LUT access (or trigger) signal (sw_inc_lut_trg) from an sw_inc_trg input signal and dr_out$_j$ (j=0 to 255) (neuron fire) signals. The LUT 1210 has an address input port 1230 for the AT value (ax_tmr(t)<0:3>) and an address import port 1240 for the current SW value (sw(t)<0:7>). It also has data output ports 1250 for the SW delta (+α(t)<0:7>). The adder 1260 adds the current SW value (sw(t)<0:7>) and the SW delta (+α(t)<0:7>). The LUT data can be loaded (written) with load_address<0:11> and load_data<0:7> before neuromorphic system operation. In this example, the length of the address input data (ax_tmr(t)<0:3> & sw(t)<0:7>) is 12 (=4+8) bits and the length of the output data (+α(t)<0:7>) is 8 bits.

Figure 13:
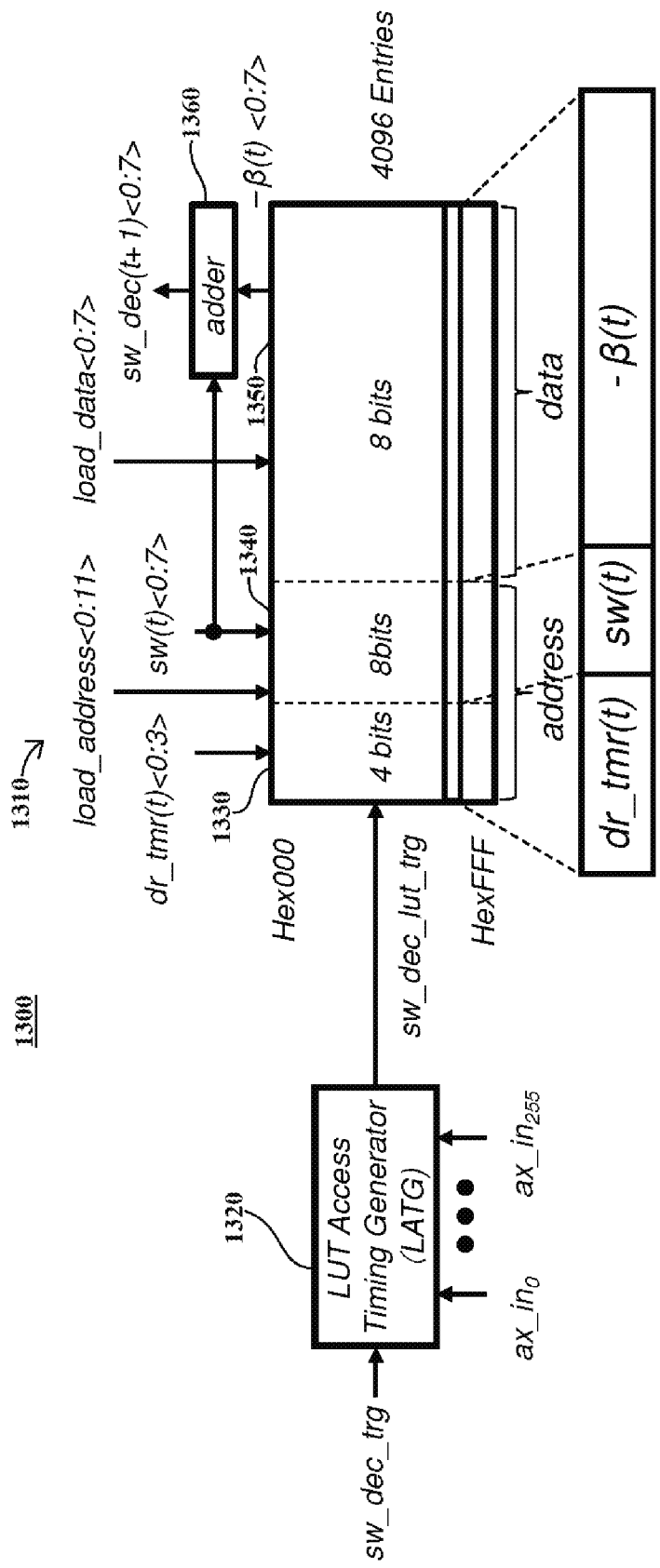
FIG. 13 is a block diagram of a Synapse Weight Decrement block 700 using an adder at the output of the lookup table, in accordance with an embodiment of the present principles.

Referring now to FIG. 13, a block diagram of the SWD block 1300 using an adder 1360 at the output of the LUT 1310 is shown. This block 1300 consists of an LUT 1310 for an SWD and an LATG 1320. The LATG 1320 generates the LUT access (or trigger) signal (sw_dec_lut_trg) from the sw_dec_trg input signal and the ax_in$_i$ (i=0 to 255) signals. The LUT 1310 has an address input port 1330 for the DT value (dr_tmr(t)<0:3>) and an address input port 1340 for the current SW value (sw(t)<0:7>). It also has data output ports 1350 for the SW delta (−β(t)<0:7>). The adder 1360 adds the current SW value (sw(t)<0:7>) and the SW delta (−β(t)<0:7>). The LUT data can be loaded (written) with the load_address<0:11> and the load_data<0:7> before operation. In this example, the length of the address input data (dr_tmr(t)<0:3> & sw(t)<0:7>) is 12 (=4+8) bits and the length of the output data (43(t)<0:7>) is 8 bits.

With this example of LUTs that are made by the equations, the behavior of the STDP model is verified below.

Figure 14:
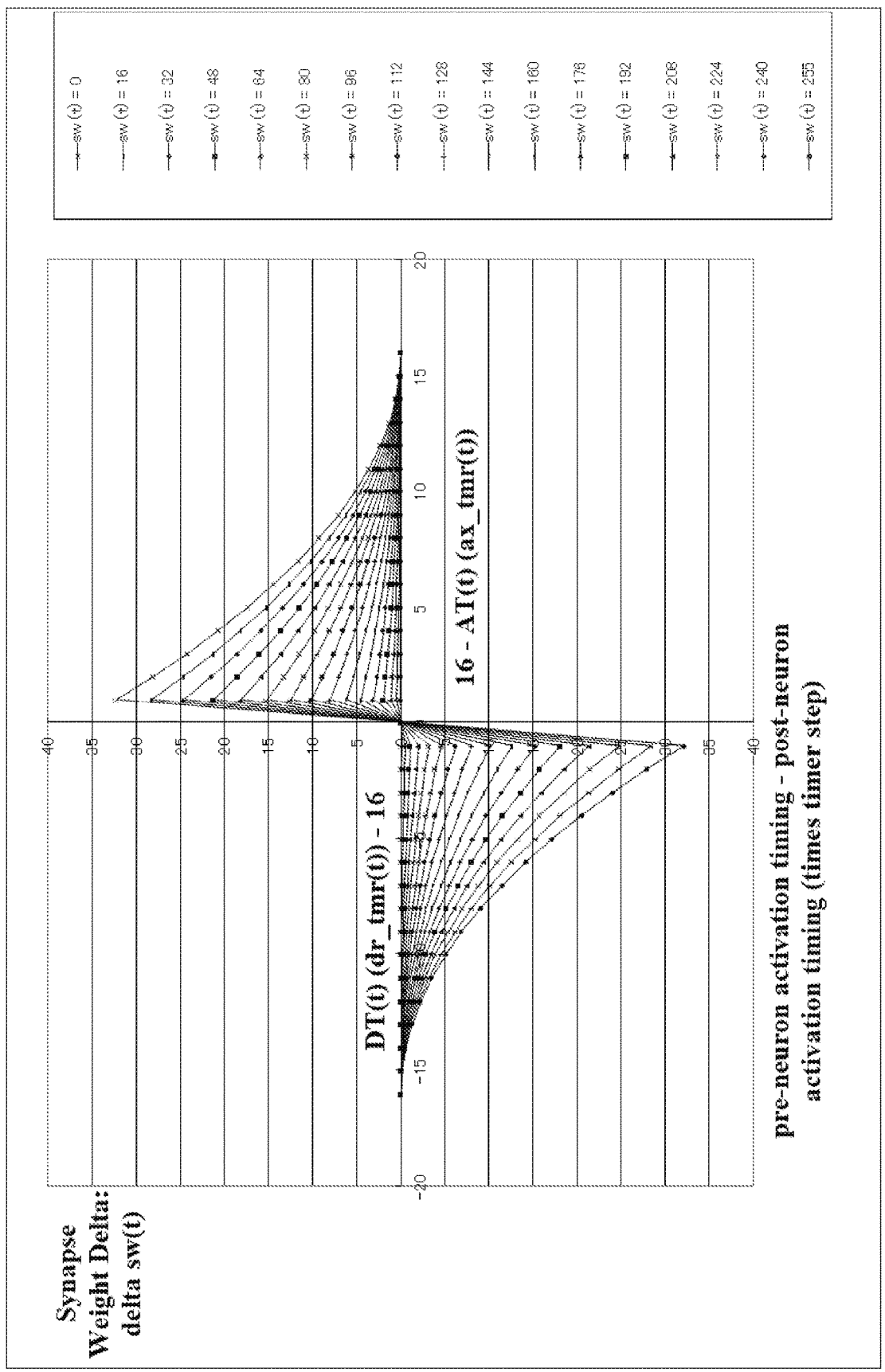
FIG. 14 is a graph representing a delta value (+α(t) and −β(t), in accordance with an embodiment of the present principles.

Referring now to FIG. 14, delta values (+α(t) and −β(t)) are shown in one graph. The SW deltas are represented for SWs of 0, 16, 32, 48, 64, 80, 96, 112, 128, 144, 160, 176, 192, 208, 224, 240, and 255. The X-axis represents the timing difference between pre-neuron activation and post-neuron activation. The positive area of the X coordinate corresponds to an (16−AT$_i$ (i-th ax_tmr(t))) (i=0 to 255) value when dr_out$_j$ (j=0 to 255) has a spike out. In this graph, X=16 corresponds to AT (i-th ax_tmr(t))=0 and X=1 corresponds to AT$_i$ (i-th ax_tmr(t))=15. Conversely, the negative area of X coordinate corresponds to a (DT$_j$ (j-th dr_tmr(t))−16) (j=0 to 255) value when ax_in$_i$ (i=0 to 255) has a spike in. In this graph, X=(−16) corresponds to DT$_j$ (j-th dr_tmr(t))=0 and X=(−1) corresponds to DT$_j$ (j-th dr_tmr(t))=15. This graph shows the following behaviors of the proposed scheme. (1) If there is any spike output at dr_out$_j$ (j=0 to 255) within 15 T$_{eval}$ cycles since AT$_i$ is reset with spike input at ax_in$_i$ (i=0 to 255), SW$_{ij}$ is incremented. The increment amount is maximum at X=1 or AT (i-th ax_tmr(t))=15 and it decreases little by little when X is larger or AT$_i$ (i-th ax_tmr(t)) is smaller.

The increment amount is 0 when X=16 or AT (i-th ax_tmr(t))=0. In other words, the increment amount increases if the timing difference from ax_in$_i$ spike to dr_out$_j$ spike decreases. The increment amount decreases if this timing difference increases. Conversely, (2) if there is any spike input at ax_in$_i$ (i=0 to 255) just after there is any spike output at dr_out$_j$ (j=0 to 255), SW$_{ij}$ is decremented. The decrement amount is maximum at X=−1 or DT$_j$ (j-th dr_tmr(t))=15 and it decreases little by little when X is smaller or DT$_j$ (j-th dr_tmr(t)) is smaller. The decrement amount is 0 when X=(−16) or DT$_j$ (j-th dr_tmr(t))=0. In other words, the decrement amount increases if the timing difference from dr_out$_j$ spike to ax_in$_i$ spike decreases. It decreases if this timing difference increases. These operations correspond to the behavior of the STDP model in which the timing difference between the axon pulse and the dendrite pulse determines the value of the next SW.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for updating synapse weight values in a Spike Time Dependent Plasticity model neuromorphic system, comprising:

selectively performing, by a hardware-based synapse weight incrementer or decrementer, one of a synapse weight increment function or a synapse weight decrement function, the hardware-based synapse weight incrementer and decrementer being independent of each other and each using a respective lookup table, to generate updated synapse weight values responsive to spike timing data, the lookup tables including contents determined at least in part by applying the synapse weight increment function and the synapse weight decrement function, the synapse weight increment function being based on an axon timer value as a function of time and synapse weight as a function of time, and the synapse weight decrement function being based on a dendrite timer value as a function of time and the synapse weight as a function of time;

storing the updated synapse weight values in a memory;

implementing a multiplexer to select one of a result of the synapse weight increment function and a result of the synapse weight decrement function to update synapse weight values; and performing, by a hardware-based processor, a learning process to integrate the updated synapse weight values stored in the memory into the Spike Time Dependent Plasticity model neuromorphic system for improved neuromorphic simulation.

2. The method of claim 1, wherein the contents of the respective lookup tables are further based on contents of a simulation, or a hardware measurement, of synapse models.

3. The method of claim 2, further comprising determining that missing data exists in the simulation or hardware measurement, and calculating the missing data by at least one of interpolation and extrapolation, each using existing data.

4. The method of claim 1, further comprising supplying the contents of the respective lookup tables based on a Spike Time Dependent Plasticity theory.

5. The method of claim 1, further comprising preloading the contents of the respective lookup tables into the respective lookup tables.

6. The method of claim 1, wherein the contents of the respective lookup tables further include delta values of one of the synapse weight increment function and the synapse weight decrement function.

7. The method of claim 1, further comprising determining increment amounts of the synapse weight values using current synapse weight values and current Axon Timer values when at least one dendrite output (neuron fire) spike arises.

8. The method of claim 1, further comprising determining decrement amounts of the synapse weight values using current synapse weight values and current Dendrite Timer values when at least one axon input spike arises.

9. The method of claim 1, wherein the contents for the respective lookup tables are determined by applying:

$$sw(t+1)=sw(t)+ax\_tmr(t)^2/p*((sw(t)-q)/q)^2q)^2$$

for the synapse weight increment function, and $$sw(t+1)=sw(t)-dr\_tmr(t)^2/p*(sw(t)/q)^2$$

for the synapse weight decrement function, wherein sw is the synapse weight, t is the time, ax_tmr(t) is the axon timer value for time t, dr_tmr(t) is the dendrite timer value for time t, and p and q are the optimization parameters.

10. The method of claim 1, further comprising:

switching from a learning mode to a non-learning mode.

11. The method of claim 1, further comprising:

determining an update for a neuron membrane potential while incorporating a leak effect to generate an updated neuron membrane potential; and storing the updated neuron memory potential in the memory wherein performing the learning process further includes simultaneously integrating the updated synapse weight values and the updated neuron membrane potential stored in the memory into the Spike Time Dependent Plasticity model neuromorphic system for improved neuromorphic simulation.

12. A computer-readable storage medium including a computer-readable program for updating synapse weight values in a Spike Time Dependent Plasticity model neuromorphic system, wherein the computer-readable program when executed on a computer causes the computer to perform the steps of:

selectively performing, by a hardware-based synapse weight incrementer or decrementer, one of a synapse weight increment function or a synapse weight decrement function, the hardware-based synapse weight incrementer and decrementer being independent of each other and each using a respective lookup table, to generate updated synapse weight values responsive to spike timing data, the lookup tables including contents determined at least in part by applying the synapse weight increment function and the synapse weight decrement function, the synapse weight increment function being based on an axon timer value as a function of time and synapse weight as a function of time, and the synapse weight decrement function being based on a dendrite timer value as a function of time and the synapse weight as a function of time;

implementing a multiplexer to select one of a result of the synapse weight increment function and a result of the synapse weight decrement function to update synapse weight values;

storing the updated synapse weight values in a memory; and performing, by a hardware-based processor, a learning process to integrate the updated synapse weight values stored in the memory into the Spike Time Dependent Plasticity model neuromorphic system for improved neuromorphic simulation.

13. The computer readable storage medium of claim 12, wherein the computer-readable program when executed on the computer causes the computer to further perform the step of preparing, by the hardware-based processor, the contents of the respective lookup tables, wherein the contents are further based on at least one of:

contents of a simulation;

a hardware measurement of synapse models; and some equations to approximate the model performance.

14. A system for updating synapse weight values in a Spike Time Dependent Plasticity model neuromorphic system, comprising:

at least one of a hardware-based synapse weight incrementer and a hardware-based synapse weight decrementer, each respectively configured to perform either a synapse weight increment function or a synapse weight decrement function, the hardware-based synapse weight incrementer and decrementer being independent of each other and each using a respective lookup table, to generate updated synapse weight values in response to spike timing data, the lookup tables including contents determined at least in part by applying the synapse weight increment function and the synapse weight decrement function, the synapse weight increment function being based on an axon timer value as a function of time and synapse weight as a function of time, and the synapse weight decrement function being based on a dendrite timer value as a function of time and the synapse weight as a function of time;

a memory configured to store the updated synapse weight values;

a multiplexer configured to select one of a result of the synapse weight increment function and a result of the synapse weight decrement function to update synapse weight values; and a hardware-based processor configured to perform a learning process to integrate the updated synapse weight values stored in the memory into the Spike Time Dependent Plasticity model neuromorphic system for improved neuromorphic simulation.

15. The system of claim 14, wherein the hardware-based processor is further configured to prepare the contents of the respective lookup tables, wherein the contents are based on at least one of:

contents of a simulation;

a hardware measurement of synapse models; and some equations to approximate the model performance.

16. The system of claim 15, wherein, in response to determining any missing data in the simulation or hardware measurement, the hardware-based processor is further configured to calculate the missing data by at least one of interpolation and extrapolation, each using existing data.

17. The system of claim 14, wherein the hardware-based processor is further configured to supply the contents of the respective lookup tables based on a Spike Time Dependent Plasticity theory.

18. The system of claim 14, wherein the hardware-based processor is further configured to determine increment amounts of the synapse weight values using current synapse weight values and current Axon Timer values when at least one dendrite output (neuron fire) spikes arise.

19. The system of claim 14, wherein the hardware-based processor is further configured to determine decrement amounts of the synapse weight values using current synapse weight values and current Dendrite Timer values when at least one axon input spikes arise.

20. The system of claim 14, wherein the hardware-based processor is further configured to:

determine an update for a neuron membrane potential while incorporating a leak effect to generate an updated neuron membrane potential;

store the updated neuron memory potential in the memory; and perform the learning process by simultaneously integrating the updated synapse weight values and the updated neuron membrane potential stored in the memory into the Spike Time Dependent Plasticity model neuromorphic system for improved neuromorphic simulation.

* * * * *